United States Patent [19]

Boeckeler

[11] Patent Number: 5,164,127
[45] Date of Patent: Nov. 17, 1992

[54] METHOD OF PREPARING MOLDED COATINGS FOR GEL COATED COMPOSITES

[75] Inventor: Rudolph H. Boeckeler, Grafton, Wis.

[73] Assignee: Cook Composites and Polymers Co., Port Washington, Wis.

[21] Appl. No.: 591,954

[22] Filed: Oct. 2, 1990

[51] Int. Cl.$^5$ ............................................. B29C 39/12
[52] U.S. Cl. .................................... 264/22; 264/1.7; 264/255
[58] Field of Search ..................... 264/22, 255, 1.7

[56] References Cited

U.S. PATENT DOCUMENTS

| | | | |
|---|---|---|---|
| 2,481,809 | 9/1949 | Barnes | 264/1.7 |
| 3,968,309 | 7/1976 | Matsuo et al. | 264/1.7 |
| 4,041,120 | 8/1977 | Oshima et al. | 264/255 |
| 4,199,421 | 4/1980 | Kamada et al. | 264/22 |
| 4,242,415 | 12/1980 | Feltzin et al. | 264/255 |
| 4,319,811 | 3/1982 | Tu et al. | 351/166 |
| 4,590,101 | 5/1986 | Knapczyk | 427/350 |
| 4,689,243 | 8/1987 | Sasaki et al. | 264/22 |
| 4,800,123 | 1/1989 | Boeckeler | 428/424.2 |
| 4,808,361 | 2/1989 | Castro et al. | 264/255 |
| 4,830,803 | 5/1989 | Matsumaru et al. | 264/255 |
| 4,911,875 | 3/1990 | Vetter et al. | 264/255 |
| 4,919,850 | 4/1990 | Blum et al. | 264/22 |

Primary Examiner—Jan H. Silbaugh
Assistant Examiner—Brian J. Eastley
Attorney, Agent, or Firm—Whyte & Hirschboeck

[57] ABSTRACT

Method of preparing superior scratch resistant coatings which are particularly well suited for use in combination with unsaturated polyester gel coats in applications where a smooth, high gloss, durable, scratch resistant surface is desirable, such as in marine and cultured marble applications, include compositions comprising at least one polyfunctional monomer having 3 or more acryloloxy groups per molecule, preferably 5 or more acryloloxy groups, and either at least one N-vinyl imido group containing monomer or at least one polyallylglycidyl ether containing compound. These coating compositions are cured either by exposure to ultraviolet radiation or by thermal means, preferably using organic peroxides.

8 Claims, No Drawings

METHOD OF PREPARING MOLDED COATINGS FOR GEL COATED COMPOSITES

FIELD OF INVENTION

The invention relates to gel coated composite materials such as those used in marine or cultured marble applications which are provided with improved scratch resistant coatings, and a method for preparing such coated products.

BACKGROUND ART

The conventional process for forming fiber reinforced plastic production boats or cultured marble vanities entails the application of a first layer inside of a female mold. The first layer of a fiber reinforced plastic boat is a gel coat which is partially cured to a condition in which the surfaces are still tacky. A fiber reinforced laminating resin is then layed up against the gel coat. Gel coats used in such processes are normally relatively thick, in the range of 0.5 to 0.8 mm, to provide protection against the environment and to hide the coarseness of the fiber reinforced main laminate.

Unsaturated polyester resins are widely used for marine and cultured marble gel coats because they are inexpensive, easy to work with and cure well at room temperature. Unsaturated polyester resins based on neopentyl glycol and isophthalic acid are currently the preferred materials for forming polyester gel coats because of their strength, flexibility, abrasion resistance and impact resistance. Nonetheless, such polyester resins are quite moisture permeable and provide less scratch and abrasion resistance than desirable. Therefore, other resins have been used for gel coats in an effort to overcome the aforementioned shortcomings. For example, vinyl ester gel coats are sometimes used when greater flexibility and resistance to water and chemicals are needed. However, vinyl esters require higher curing temperatures and are more expensive.

Epoxy resins have also been employed to give strong flexible and lighter weight composites with excellent water resistance properties. However, epoxies are as much as four times as expensive as polyesters and are much more difficult to work with and to cure. In U.S. Pat. No. 4,800,123 issued Jan. 24, 1989 and assigned to Freeman Chemical Corporation there is disclosed a method of coating urethane elastomers to provide such products as scratch resistant optically clear lenses such as those used for eye glasses. That disclosure did not, however, contemplate or address the problem of providing scratch resistant coatings on gel coated laminates such as those of the polyester type.

Various protective coatings have been applied over gel coated laminates after they have been cured in an effort to improve gloss retention as well as improved protection against water and chemical attack. Such coatings are generally applied to the cured laminate by conventional application techniques such as dipping, spinning, spraying, curtain and roller coating techniques. Coatings applied in this manner, however, usually require several hours of curing time and frequently demonstrate poor adhesion to the gel coat because of residual mold release materials on the gel coat surface. Although such mold release compositions can sometimes be removed by sanding or solvent wiping, the removal process involves further costly and time consuming processing steps in addition to altering and sometimes damaging the appearance of the surface.

The protective coating compositions currently available contain a high content of volatile organic materials, constituting environmental hazards, and often pose health risks to workers. Furthermore, such conventionally applied coatings often show surface imperfections such as orange peel effects, craters, runs, dust particles, and the like.

In the light of the foregoing continuing problems and various efforts to overcome them which have not been entirely satisfactory, a need exists for improved scratch resistant coatings and processes for forming such coatings.

SUMMARY OF THE INVENTION

It is the principal object of this invention to provide an in-mold coating composition for upgrading gel coated laminates.

Another object of the present invention is to provide a method for applying a very hard scratch resistant coating to a gel coated laminate using an in-mold process.

A further object of the present invention is to provide an in-mold coating process which eliminates the necessity of mold release agents.

A still further object of the present invention is to provide a coating for gel coated laminates which improves the water resistance of the laminate.

The present invention encompasses a coating composition, using an in-mold method of application, which cures very quickly, has excellent adhesion to the gel coat, provides superior protection against abrasion, scratching, water and chemical attack and is free of surface imperfections.

The coating composition is 100% solids, or very high solids. It can be applied to the mold surface by any conventional technique such as rolling, dipping, spraying, spinning or curtain coating, etc.

Briefly summarized, the foregoing and other objects and advantages of the invention are accomplished by providing a mold having a surface of complex shape corresponding to a desired final molded article, in negative relief. At least a portion of the mold surface is coated with a composition which contains at least one polyfunctional monomer having three or more acrylyloxy groups per molecule and a second monomer selected from the group consisting of monomers containing at least one N-vinyl imido group and polyallylglycidyl ether compounds. The coating is at least partially cured. A gel coating composition selected from the group consisting of polyesters, vinylesters and epoxies is then applied over the surface coating. After completion of the cure the composite laminate is removed from the mold.

DETAILED DESCRIPTION

The preferred protective coating compositions include those described in Tu et. al. U.S. Pat. No. 4,319,811 issued Mar. 16, 1982, and U.S. Pat. No. 4,800,123. Specifically, the preferred materials to be employed as a coating composition are the hexaacrylic and pentaacrylic esters of dipentaerythritol. Mixtures of various acrylyloxy materials may also be employed. Such materials containing acrylyloxy groups have also sometimes referred to as "acryloyloxy" or "acryloloxy" materials, and such designations are considered to be synonymous herein. As a second component in the coating composition used in connection with the present invention, it is preferred that there be included either an N-vinyl imido containing monomer such as N-vinyl-2-pyrrolidone or a polyallylglycidyl ether compound of the type described in U.S. Pat. No. 4,590,101 issued to Kanapczyk on May 20, 1986. The disclosures of said U.S. Patents relating to such components are incorporated by reference herein.

Polymerization of the coatihg composition can be accomplished either by exposure to ultraviolet light or by thermal means if a suitable catalyst is included, such as peroxide catalysts and copromoters. If ultraviolet radiation is used, photoinitiators are employed. Such photoinitiators include organic carbonyl compounds such as such as benzophenone, benzanthrone, benzoin and alkyl ethers thereof, 2,2 diethoxyacetophenone, 2,2 dimethoxy, 2 phenylacetophenone, p-phenoxy dichloroacetophenone, 2-hydroxycyclohexylphenone, 2-hydroxyisopropylphenone, and 1-phenyl, propanedione-2-(ethoxy carboxyl) oxime.

If the cure is to be accomplished using peroxide catalysts, any well-known peroxide catalyst can be added to the coating material. A preferred catalyst is 2,5 dimethyl-2, 5-bis (2-ethylhexanoylperoxy) hexane commercially available under the trade name Lupersol® 256 from Pennwalt Corporation. Other peroxides or hydroperoxides such as methyl ethyl ketone peroxide, benzoyl peroxide, cumene hydroperoxide, and any of the various peroxyesters or the like can be used. In the case of the preferred coating compositions, sufficient cure for application of the gel coat is accomplished at room temperature in 5 to 6 hours or at 70° C. to 100° C. in 10 to 45 minutes.

It is also contemplated that metallic driers or copromoters may be added to assist in curing. Especially effective are cobalt based driers such as cobalt octoate and cobalt napthenate or complexes of cobalt and potassium organo compounds. Solvents may be added to reduce viscosity of the coating composites for application to the mold. Additives such as flourocarbons, silicones, cellulose acetate butyrate, etc. may be added to control flow, leveling, thixotrophy and viscosity.

The preferred weight percentage ranges of ingredients to be employed in the protective coating composition used in the practice of the invention are: acrylyloxy material 65 to 95 per cent, second component (as described) 5 to 35 per cent, photo initiator 0.2 to 8 per cent, peroxide catalyst and copromoters 0.2 to 3 per cent.

The resin employed as a gel coat includes any of the conventional resins used for that purpose heretofore. The gel coat, in general, can be described as fairly thick relative to the thickness of a coat of paint but still less than half of a milimeter in thickness. For a liquid layer of this thickness to stay in place on a mold surface that is not in a horizontal orientation, it should be thixotropic. In other words, the viscosity is relatively low during application by such means as spraying, brushing or rolling but viscous enough to resist gravity as soon as the application procedure stops.

Preferred materials for the gel coats of this invention include unsaturated polyester resins based on neopentyl glycol and isophthalic acid. Other gel coats such as vinyl esters and epoxies can also be used in cases where increased cost can be justified. In other applications, where less moisture resistance can be tolerated, orthophthalic acid based resins can be employed.

The preferred matrix resins used in the molding resin layer should contain as low an amount of water soluble materials as possible, particularly for materials for such end use applications as marine applications, eg. boat hulls, sinks, vanities, counter tops, bath tubs, shower stalls flooring materials or similar applications.

In the molding process of the present invention, generally two or more shaped elements cooperate to define a mold cavity. Otherwise a single cavity of complex shape can be provided. The coating of the present invention is applied to at least a portion of the overall mold surface. The mold contact surfaces may be formed from any conventional materials such as glass, reinforced polyesters, epoxies, steel aluminum or other metals.

The invention will be further explained and illustrated by the following examples wherein all parts are by weight unless otherwise indicated.

EXAMPLE 1

An in-mold coating composition consisting of 80 parts of dipentaerythritol monohydroxy pentaacrylate (SR399 from Sartomer Company), 0.2 parts of a 12% solution of cobalt octoate, 0.05 parts of methyl ethyl ketoxime, 20 parts of a polyallylglycidyl ether (Santolink® XI-100 from Monsanto Corporation) and 1.0 parts of benzoyl dimethyl ketal (Irgacure® 651 from Ciba-Geigy) was applied with a 0.5 mil (0.013 mm) draw down bar to a clean glass plate.

The film was subjected to UV radiation from a single 200 watt per inch mercury vapor lamp for 8 seconds. Immediately thereafter, 0.5 mm of a benzoyl peroxide catalyzed gel coat resin based on neopentyl glycol and isphthalic acid (Cook Composites and Polymers 44-4901 gel coat resin) was applied to the in-mold coating and cured for 30 minutes at 70° C.

To the gel coat was applied a layer approximately 100 mils thick of a dicyclopentadiene based polyester laminating resin catalyzed with 1.25% methyl ethyl ketone peroxide (DDM-9 from Pennwalt Corporation). The laminating resin was reinforced with 2 layers of 1½ oz. (42.5 g.) chopped glass to give a glass content of 25%. A waxed glass plate was placed over the laminating resin and clamped to the first glass plate using Teflon® spacers to maintain a constant composite thickness of 90 mils (2.3 mm).

After curing overnight at room temperature, the composite was removed from the glass mold. The in-mold coated surface released easily from the glass plate. The coating was very smooth and free of blemishes. It exhibited a 60° Gardner meter gloss of 95 and a pencil hardness in excess of 7H. It did not soften or delaminate after 200 double rubs with methyl ethyl ketone. It showed no adhesion loss from the gel coat when subjected to cross hatching and pulling with Scotch® Brand 600 adhesive tape (3M Company) in accordance with ASTM #3359-83B. It showed no scratching when subjected to 25 rubs using No. 00 steel wool.

The in-mold coated composite was placed in a Cleveland Humidity cabinet. After 4 weeks the coated composite maintained its original gloss, hardness, solvent resistance and scratch resistance.

The uncoated panel demonstrated an initial gloss of 95 on a 60° meter, 3H pencil hardness, 200 MEK rub resistance and was easily scratched by 2-5 rubs with No. 00 steel wool.

EXAMPLE 2

An in-mold coating composition consisting of 80 parts of dipentaerythritol monohydroxy pentaacrylate (SR399, Sartomer), 0.2 parts of a 12% solution of cobalt octoate, 0.05 parts methyl ethyl ketoxime, 5 parts of methyl ethyl ketone, 20 parts of polyallylglycidyl ether (Santolink ® XI-100, Monsanto) and 1 part methyl ethyl ketone peroxide (Thermacure GC, Cook Composites and Polymers) was applied at a 1 mil (0.0254 mm) wet thickness to a clean glass plate. The film was cured from 20 minutes in a 70° C. oven.

The same gel coating was applied using the procedure described in Example No. 1. Then a laminating resin was applied as in Example 1.

The in-mold coating exhibited the same gloss, hardness, solvent and scratch resistance as the composition of Example No. 1.

EXAMPLE NO. 3

A polyester mold was surface treated by wiping with polyvinyl alcohol mold release.

The hard coat composition of Example No. 2 was applied at 1 mil thickness and subjected to a heat lamp for 10 minutes (approximately 60° C.). The coating at this stage was slightly tacky but did not flow.

The same gel coat was applied and cured using the procedure of Example No. 1.

The hard coat released easily from the mold surface and exhibited the characteristics of Examples No. 1 and 2.

EXAMPLE NO. 4

An in-mold coating composition consisting of 80 parts SR399, 20 parts N-vinyl-2-pyrrolidone (N-VP from GAF Corp) and 4 parts of Irgacure ® 651 was applied at 0.025 mm thickness to the PVA prepared mold of Example No. 3.

The hard coat was cured for 5 seconds under a 400 watt portable UV lamp. The hard coat was at this point dry to the touch, but could be marred by rubbing with a blunt object such as the back of a fingernail.

After laminating and curing the gel coat using the procedure of Example No. 1, the hard coated composite released easily from the mold surface and exhibited the same characteristics as in Example No. 1.

What is claimed is:

1. A method of preparing a composite molded article comprising:
    providing a mold having a surface of complex shape corresponding to said article in negative relief,
    coating at least a portion of said mold surface with a coating composition comprising at least one polyfunctional monomer having three or more acrylyloxy groups per molecule and a second monomer selected from the group consisting of monomers containing at least one N-vinyl imido group and polyallylglycidyl ether compounds,
    at least partially curing said coating,
    applying over said coating and said mold surface a coating of a gel composition selected from the group consisting of polyesters, vinyl esters and epoxies,
    at least partially curing said gel composition,
    applying a fiber reinforced molding resin over said gel composition and, curing the resulting composite materials.

2. A method according to claim 1 wherein said mold surface is free of release agents.

3. A method according to claim 1 wherein the entire surface of said mold is coated with the coating composition.

4. A method according to claim 1 wherein said molding resin is selected from the group consisting of polyester resins, vinyl ester resins and epoxy resins.

5. A method according to claim 4 wherein said molding resin is an isophthalic acid based polyester resin.

6. A method according to claim 1 wherein said polyfunctional monomer has 5 or 6 acryloloxy groups per molecule.

7. A method according to claim 1 wherein said coating composition contains a peroxide catalyst and said composition is cured at ambient or higher temperatures.

8. A method according to claim 1 wherein said coating composition contains a photoinitiator and said coated radiation surface is exposed to ultraviolet radiation to initiate curing of said composition.

* * * * *